United States Patent
Huang

[11] Patent Number: 6,026,979
[45] Date of Patent: Feb. 22, 2000

[54] THERMOS BOTTLE

[76] Inventor: Frank T. H. Huang, Suite 804, No. 128, Sec. 3, Ming-Sheng E Rd., Taipei, Taiwan

[21] Appl. No.: 09/232,661

[22] Filed: Jan. 19, 1999

[51] Int. Cl.[7] .................................................. B65D 47/34
[52] U.S. Cl. .............................. 220/592.18; 220/62.12; 220/740; 220/23.91; 222/401
[58] Field of Search ............... 220/592.18, 592.16, 220/592.23, 592.27, 23.86, 23.87, 23.91, 202, 848, 360, 62.12, 740, 739; 222/131, 183, 401, 402, 209, 385

[56] References Cited

U.S. PATENT DOCUMENTS

| | | | |
|---|---|---|---|
| 2,390,831 | 12/1945 | Fitch | 220/401 |
| 4,116,366 | 9/1978 | Takenakashima et al. | 222/131 |
| 4,320,856 | 3/1982 | Stewart et al. | 220/592.27 |
| 4,359,174 | 11/1982 | Ikunosuke et al. | 222/131 |
| 4,550,864 | 11/1985 | Tarozzi et al. | 222/209 |
| 4,986,452 | 1/1991 | Tkatsuki et al. | 222/209 |
| 5,887,760 | 3/1999 | Johnson | 222/209 |
| 5,894,960 | 4/1999 | Rodden, Jr. et al. | 222/207 |

*Primary Examiner*—Stephen Castellano
*Attorney, Agent, or Firm*—Bacon & Thomas, PLLC

[57] ABSTRACT

A press type thermos bottle comprises a bottle body with an internal liquid tank, a lower cover collared onto the upper end of the bottle body having a water pipe inset in the liquid tank and a through hole at its front end for one end of the water pipe to project out, and an upper cover having its rear end screw-jointed with the rear end of the lower cover and its front end snap-retainable to the front end of the lower cover. A valve disposed in the upper cover is pivot-jointed to a press mechanism via a connecting rod, wherein the lower end of the valve is inset in an air supply mechanism that is used to force water to flow out from the tank through the water pipe when the press mechanism is pressed.

1 Claim, 4 Drawing Sheets

THERMOS BOTTLE

BACKGROUND OF THE INVENTION

This invention relates to a press type thermos bottle, particularly to a thermos bottle designed for convenient and easy press.

A common thermos bottle usually consists of a bottle body and a bottle cover collared onto the body, wherein a press portion is arranged in the bottle cover for pressing to provide water, and meanwhile, a snap-retaining mechanism is also enclosed in the body cover to avoid any unexpected press for security consideration. However, in the case the press portion is forgotten to be snap retained, an incautious press may cause people scalded.

SUMMARY OF THE INVENTION

In view of the above imperfection, the inventor is benefited with years of manufacturing experience in related field to have an improved construction of this invention developed and proposed that requires no extra snap-retaining mechanism.

A press type thermos bottle comprises a bottle body with an internal liquid tank, a lower cover collared onto the upper end of the bottle body having a water pipe inset in the liquid tank and a through hole at its front end for one end of the water pipe to project out, and an upper cover having its rear end screw-jointed with the rear end of the lower cover and its front end snap-retainable to the front end of the lower cover. A valve disposed in the upper cover is pivot-jointed to a press mechanism via a connecting rod, wherein the lower end of the valve is inset in an air supply mechanism that is used to force water to flow out from the tank through the water pipe when the press mechanism is pressed.

BRIEF DESCRIPTION OF THE DRAWINGS

For a better understanding to the present invention, together with further advantages or features thereof, at least one preferred embodiment will be elucidated below with reference to the annexed drawings in which.

DETAILED DESCRIPTION OF THE PREFERRED EMBODIMENT

Figure 1:
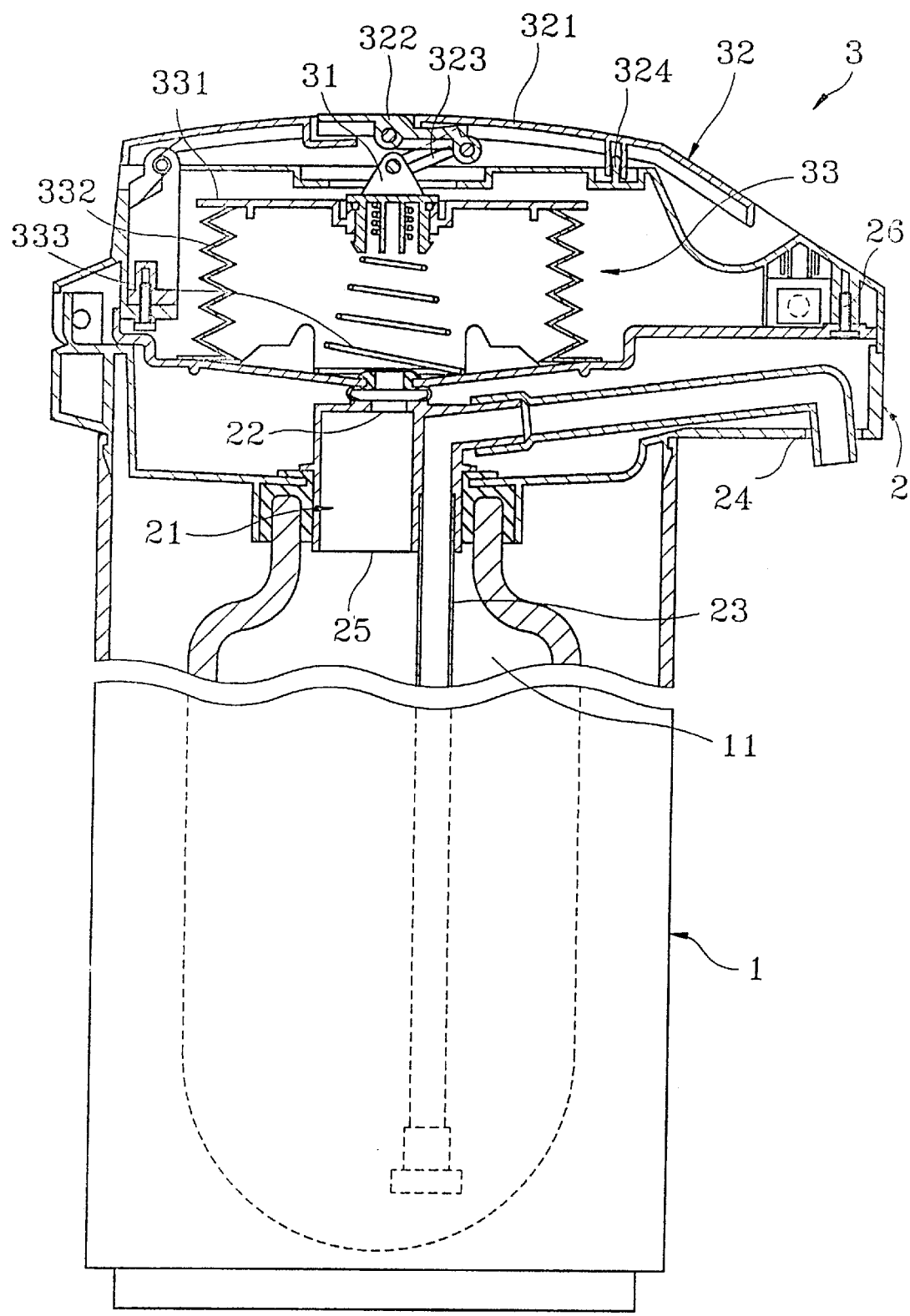
FIG. 1 is a structural schematic view of this invention.

As shown in FIG. 1, this invention comprises a bottle body 1, a lower cover 2, an upper cover 3, a press mechanism 32, and an air supply mechanism 33. A liquid tank 11 disposed in the bottle body 1 is provided with an opening at its upper end. The lower cover 2 collared onto to the bottle body 1 is offered with an air tank 21, wherein a vent 22, 25 is opened at its upper and lower end respectively; a water pipe 23 inset in the liquid tank 11 passes laterally by the air tank 21. A through hole 24 is formed at front end of the lower cover 2 for the water pipe 23 to project out, and its rear end of the lower cover 2 is screw-jointed with and its front end can be snap-retained via a snap fastener 26 to corresponding ends of the upper cover 3 respectively. The upper cover 3 itself is a hollow housing unit, wherein a valve 31 is provided to its upper end. The valve 31 pivot-jointed to the press mechanism 32 is inset in the air supply mechanism 33. The press mechanism 32 contains a press portion 321 whose rear end is coupled to the rear end of the upper cover 3 and also in connection with a supporting rod 322, which is connected to the valve 31 via a supporting rod 323. The front end of the press portion 321 is provided with a snap-fastening portion 324 for retaining at the upper cover 3.

An air supply mechanism 33 contains a press pan 331 connecting with bottom end of the upper cover 3 via a flexible compressor 332, which contains an internal spring 333 connecting the valve 31 and bottom end of the upper cover 3.

Figure 2A:
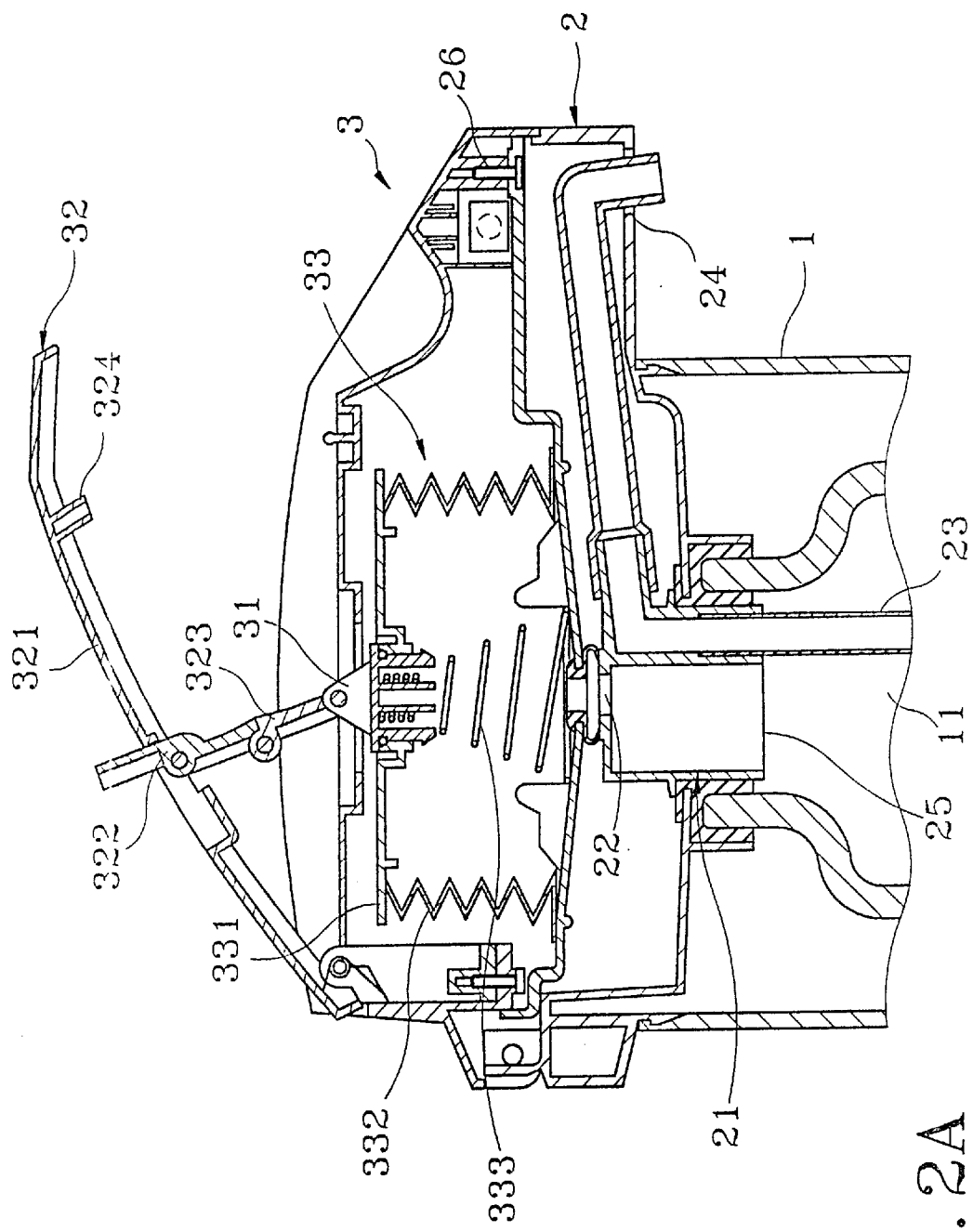
FIG. 2A is a schematic view showing action of this invention.
Figure 2B:
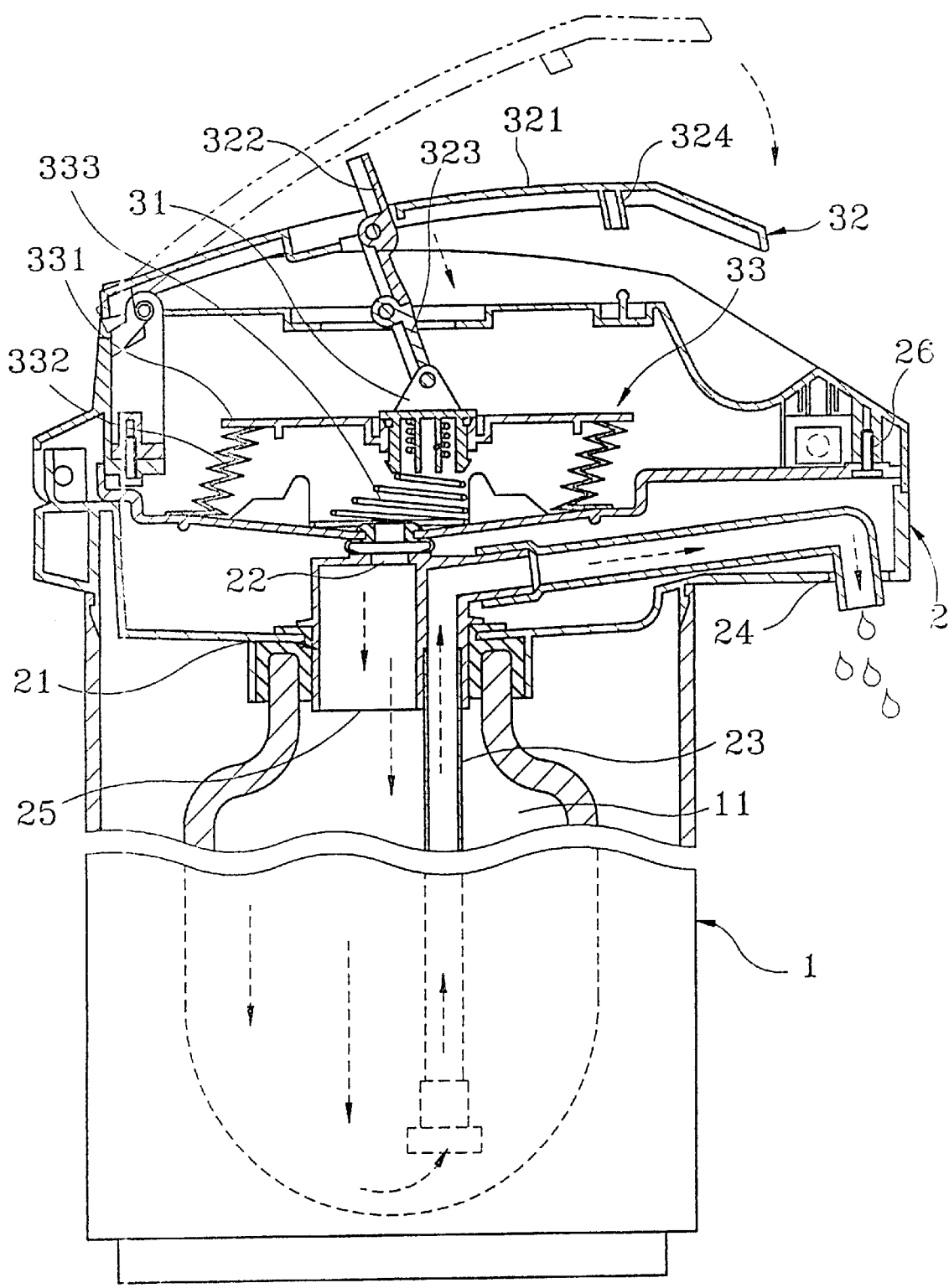
FIG. 2B is another schematic view showing action of this invention.
Figure 3:
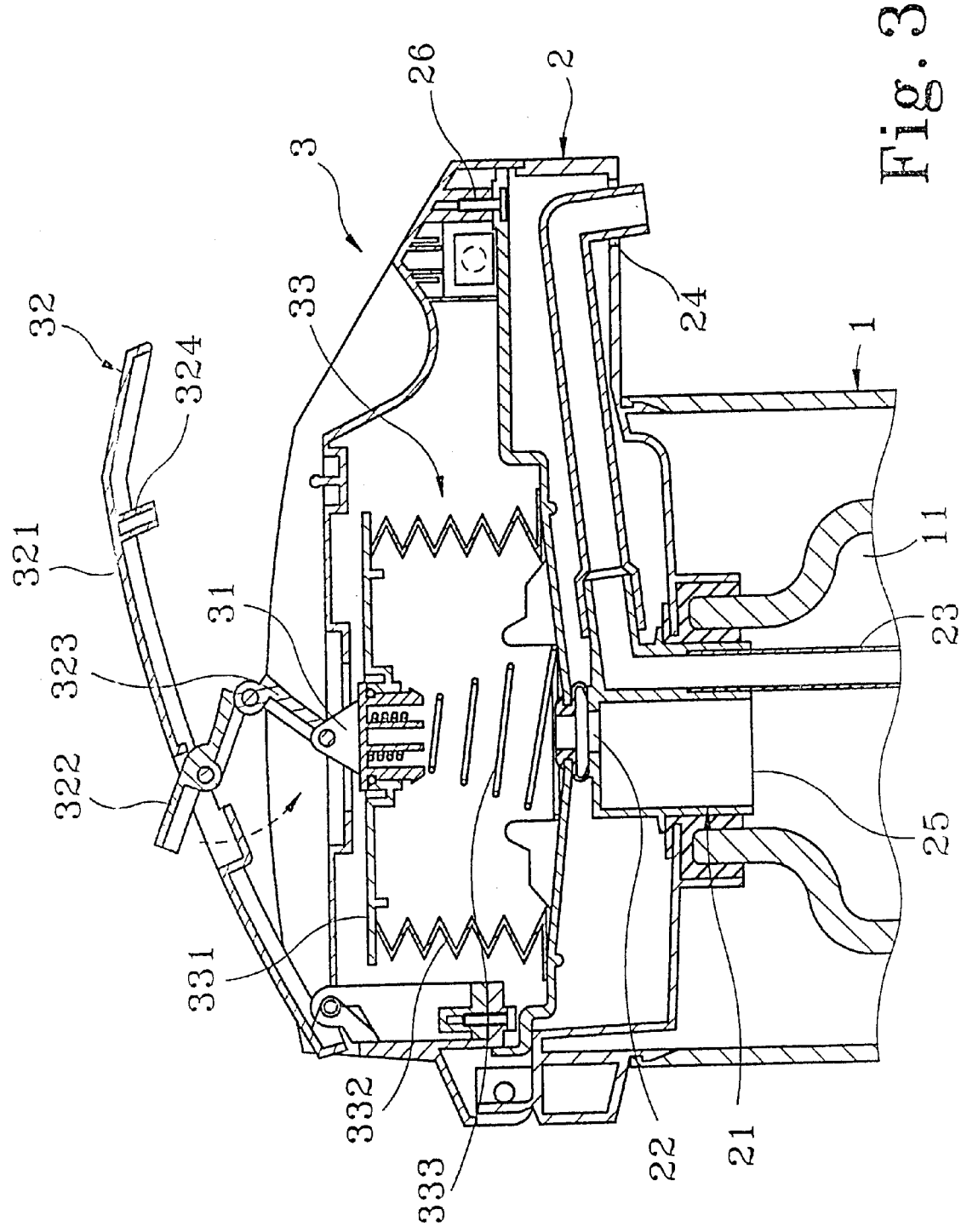
FIG. 3 is a further schematic view showing action of this invention.

As shown in FIG. 2A, when the press portion 321 is pulled away from the upper cover 3, two supporting rods 322, 323 will be snap-fastened with each other, and one end of the supporting rod 322 is protruded out of the press portion 321. As shown in FIG. 2B, when the press portion 321 is pressed, the valve 31 will be forced to move downward to press the press pan 331 and so the flexible compressor 332 and spring 333, so that air pressure is increased in the liquid tank 11 to expel water to flow out of mouth of the lower cover 2 through water pipe 23. In virtue of elastic force of the spring 333, the press portion 321 will rebound back for next press. As shown in FIG. 3, when no more water is required, a user may push the protruded end of the supporting rod 322 to release those two supporting rods from snap-fastening condition, and the press portion 321 can be snap-retained to the upper cover 3.

In the above described, at least one preferred embodiment has been elucidated with reference to relating drawings annexed, it is apparent that numerous variations or modifications may be made without departing from the true spirit and scope thereof, as set forth in the following claims.

What is claimed is:

1. A thermos bottle, comprising:

a bottle body having an internal liquid tank, wherein an opening is formed at an upper end of said liquid tank;

a lower cover collared onto an upper end of said bottle body, wherein an air tank fixed to said lower cover is provided with a vent at its upper end and lower end respectively; a water pipe is inset in said liquid tank; a through hole is formed at a front end of said lower cover for one end of said water pipe to project out;

an upper cover having a rear end screw-jointed and a front end snap-fastened to corresponding ends of said lower cover; wherein said upper cover is a hollow housing unit having its upper end pivot-jointed to a valve of a press mechanism; a lower end of said valve is inset in an air supply mechanism;

said press mechanism containing a press portion, wherein the rear end of said press portion is pivot-jointed to the rear end of said upper cover; at a position adjacent to its center, said press portion is pivot-jointed to a supporting rod, which is in turn pivot-jointed to said valve via another supporting rod; a snap-fastening portion is arranged at the front end of said press portion for snap-retaining at said upper cover;

said air supply mechanism containing a press pan, wherein said valve is supported by said press pan, which is connected to the bottom end of said upper cover via a flexible air compressor; a spring is disposed in said air compressor for connecting said valve to the bottom of said upper cover;

by raising up said press portion, those two supporting rods being stretched to support each other, and by pressing said press portion down, said valve, press pan, flexible air compressor, and spring being driven to supply air into said liquid tank to force the water to flow out, and in virtue of elastic force of said spring, said press portion being restored and ready for next press; in idle period, a push of protruded portion of the upper supporting rod over said press portion, those two supporting rods becoming released from snap-fastened condition, and whereby said press portion can be snap-retained to said upper cover to nullify any further press.

* * * * *